US007835747B2

(12) United States Patent
Benco et al.

(10) Patent No.: US 7,835,747 B2
(45) Date of Patent: Nov. 16, 2010

(54) METHOD FOR SENDING A MESSAGE TO A CALLING PHONE WHEN CALLED PHONE ABORTS AN INCOMING CALL REQUEST

(75) Inventors: David S Benco, Winfield, IL (US); Paresh C Kanabar, Naperville, IL (US); John C V Nguyen, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1399 days.

(21) Appl. No.: 11/134,708

(22) Filed: May 20, 2005

(65) Prior Publication Data
US 2006/0264216 A1    Nov. 23, 2006

(51) Int. Cl.
*H04W 40/00* (2009.01)
(52) U.S. Cl. ............... 455/445; 455/415; 455/417; 455/567; 379/142.07; 379/211.01; 379/211.02; 379/212.01
(58) Field of Classification Search ............ 455/415, 455/567, 412.2, 445, 417; 379/142.08, 120
See application file for complete search history.

(56) References Cited

U.S. PATENT DOCUMENTS

| | | | | |
|---|---|---|---|---|
| 5,329,578 A | * | 7/1994 | Brennan et al. | 379/211.03 |
| 5,475,737 A | * | 12/1995 | Garner et al. | 379/88.26 |
| 5,758,280 A | * | 5/1998 | Kimura | 455/412.2 |
| 5,960,367 A | * | 9/1999 | Kita | 455/567 |
| 5,991,620 A | * | 11/1999 | Kingdon et al. | 455/432.3 |
| 5,995,852 A | * | 11/1999 | Yasuda et al. | 455/567 |
| 6,185,433 B1 | * | 2/2001 | Lele et al. | 455/528 |
| 6,253,075 B1 | * | 6/2001 | Beghtol et al. | 455/415 |
| 6,501,967 B1 | * | 12/2002 | Makela et al. | 455/567 |
| 7,024,184 B2 | * | 4/2006 | Erb et al. | 455/417 |
| 7,027,840 B2 | * | 4/2006 | McKee et al. | 455/567 |
| 7,231,232 B2 | * | 6/2007 | Osann, Jr. | 455/567 |
| 7,433,680 B2 | * | 10/2008 | Jenkins et al. | 455/412.1 |
| 7,474,889 B2 | * | 1/2009 | Bhakta et al. | 455/412.2 |
| 7,565,115 B2 | * | 7/2009 | Alexis | 455/74.1 |
| 7,643,625 B2 | * | 1/2010 | Pearson | 379/201.01 |
| 2001/0044307 A1 | * | 11/2001 | Nakamura et al. | 455/445 |
| 2002/0142756 A1 | * | 10/2002 | Rutledge et al. | 455/412 |
| 2002/0193125 A1 | * | 12/2002 | Smith | 455/458 |
| 2004/0209606 A1 | * | 10/2004 | Cleary et al. | 455/415 |
| 2005/0227740 A1 | * | 10/2005 | Orbach | 455/567 |
| 2006/0246881 A1 | * | 11/2006 | Winkler et al. | 455/415 |

* cited by examiner

*Primary Examiner*—Sharad Rampuria
(74) *Attorney, Agent, or Firm*—John B. MacIntyre

(57) ABSTRACT

The present invention provides a method for sending a message to a calling phone when a called phone aborts an incoming call request. A mobile unit receives a call request from a calling phone. The communication network determines that the mobile unit has aborted the call request during ringing. For example, the mobile unit may abort the call request by pressing a predetermined key, such as the <END> key, on the mobile unit. The communication network alerts the calling phone that the mobile unit aborted the call request during ringing. The network can play a message to the calling phone that the mobile unit has aborted the call request during ringing, and the message can include additional information, such as the expected length of time that the mobile unit will be unavailable or other predetermined messages.

12 Claims, 2 Drawing Sheets

METHOD FOR SENDING A MESSAGE TO A CALLING PHONE WHEN CALLED PHONE ABORTS AN INCOMING CALL REQUEST

FIELD OF THE INVENTION

The present invention relates generally to wireless communication systems, and more particularly to a call request for a mobile unit in a wireless communication network.

BACKGROUND OF THE INVENTION

Mobile service providers want to increase the maximum number of Busy Hour Call Attempts (BHCA) in order to efficiently serve the increasing number of mobile subscribers to the mobile service provider.

Calls placed to a mobile unit require call setup procedures. These call setup procedures reserve resources from the wireless communication network. In the case when a call does not get completed, the resources have to be released. During the time that they are reserved, they are unavailable for other users.

One situation that unnecessarily consumes network resources is a call request placed to a mobile subscriber that does not want to answer the call. The network resources are reserved until the call request is dropped. This situation therefore consumes network resources in a situation where a call is not going to be completed.

Therefore, a need exists for a method for increasing the number of calls that can be processed in wireless communication systems.

BRIEF SUMMARY OF THE INVENTION

The present invention provides a method for sending a message to a calling phone when a called phone aborts an incoming call request during ringing. A wireless communication network receives a call request for a mobile unit. The wireless communication network rings the mobile unit. The ringing of the mobile unit requires the reservation of wireless system resources by the MSC.

In accordance with an exemplary embodiment of the present invention, the mobile unit can end ringing and send a message to the calling phone. This enhances communication between the called mobile unit and the calling phone while conserving valuable system resources.

The wireless communication network determines if the mobile unit has aborted the call request during ringing, such as by pressing the <END> key on the mobile unit. A user of the mobile unit may also press additional keys prior to the <END> key, and these additional keystrokes can be utilized to send additional information to the calling phone. If the mobile unit does not abort the call during ringing, typical call processing occurs.

If the mobile unit aborts the call during ringing, the wireless communication network alerts the calling phone that the mobile unit has aborted the call request during ringing, such as by playing a message to the calling phone.

The MSC preferably receives the key sequence that the mobile unit pressed to abort the call request during ringing. The user of the called mobile unit may press, for example, the <END> key during ringing. In this scenario, the called mobile unit sends a message to an associated base station that the <END> key has been pressed. The base station alerts the MSC, which knows that from the key pressed that the called mobile unit has aborted the call request during ringing. The MSC then alerts the calling party that the called mobile unit has denied the call request. The user can, in conjunction with the service provider, define alternate methods of alerting the MSC that the call request is being aborted during ringing, such as key sequences defined by the user.

A user of the called mobile unit can also press the <END> key subsequent to a numerical sequence representing the number of minutes that the user expects the current call to last. In this embodiment, the MSC sends a message to the calling phone that the called mobile unit aborted the call ringing and will not be available for the number of minutes that the user entered into the mobile unit keypad. In accordance with one embodiment of the present invention, the MSC prevents the called party from completing a call request to the called mobile unit until the time period entered by the user of the called mobile unit has expired. Further, the MSC can block any callers from completing a call request during this time period.

In a further exemplary embodiment, the user of the called mobile unit can press a predetermined key sequence during ringing that alerts the MSC that the called mobile unit does not want to answer this call. Further, the predetermined key sequence can also convey additional information to the MSC and the calling phone. The predetermined key sequence can be a default set established by the service provider, or can be programmed by the user. The user can also send a message that the user is busy and will return the call as soon as possible.

The MSC then releases the call and all of the system resources that were reserved during the call request. The present invention therefore benefits wireless service providers by allowing the inclusion of enhanced features and the increase in revenue generation and resource utilization. In addition, the present invention provides for enhanced communication between a called party and a calling party without requiring additional bandwidth, but rather by utilizing less bandwidth. By providing additional information to a calling party during a call reject, the present invention conserves system resources by lowering the chance of a subsequent unsuccessful callback from the calling party.

DETAILED DESCRIPTION OF THE INVENTION

Figure 1:
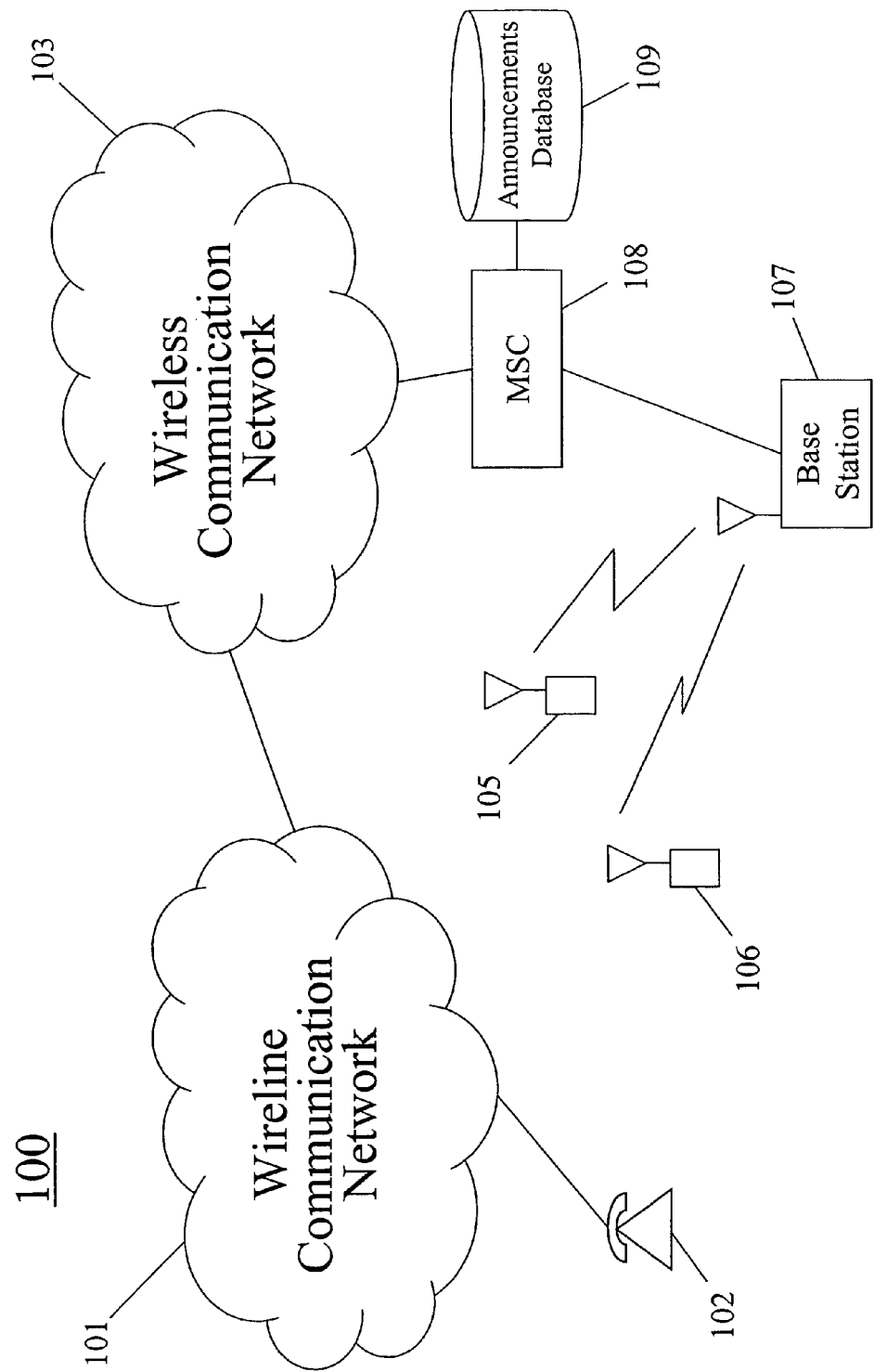
FIG. 1 depicts a communication system including a wireline communication network and a wireless communication network in accordance with an exemplary embodiment of the present invention.

FIG. 1 depicts a communication system 100 in accordance with an exemplary embodiment of the present invention. Communication system 100 includes a wireline communication network 101 and a wireless communication network 103. Communication system 100 may include a plurality of wireless networks, but only wireless communication network 103 is depicted in FIG. 1 for clarity.

Wireline communication network 101 is a wireline network that allows wireline devices to access a telephone network, such as the Public Switched Telephone Network (PSTN). Customer Premises Equipment (CPE) 102 is a telephone unit that allows communication with other users via wireline communication network 101.

Wireless communication network 103 includes at least one Mobile Switching Center (MSC) 108, a base station 107, and an announcements database 109. Each MSC is connected to a plurality of base stations, although only a single base station 107 is depicted in FIG. 1 for clarity. MSC 108 processes call and service requests initiated by and intended for mobile units 105 and 106 and allocates the required transmission and signaling resources.

Wireless communication network 103 can utilize any wireless protocol, including but not limited to analog, such as AMPS, TACS and NMT, or digital, such as GSM, TDMA, CDMA, GPRS, EDGE, IS-95, IS-95B, HDR, WCDMA, and CDMA2000.

Base station 107 communicates with wireless communication network 103 via MSC 108 and communicates over-the-air with mobile units 105 and 106. Although only one base station and two mobile units are depicted in FIG. 1 for clarity, it should be understood that wireless communication network 103 typically includes a plurality of MSCs, each of which communicates with a plurality of base stations, and each base station services a plurality of wireless units. Base Station 107 is a wireless station that preferably includes connections to the controlling servers via IP (Internet Protocol) or traditional switching mechanisms.

In an exemplary embodiment, mobile units 105 and 106 are wireless phones. In a further exemplary embodiment, mobile units 105 and 106 can be Personal Digital Assistants (PDAs), wireless email terminals, or any other communications device that is capable of communicating with wireless communication network 103.

Announcements database 109 includes messages that can be sent to a calling phone. Messages in announcements database 109 can be default messages provided by a service provider or messages prerecorded by a user of called mobile unit 105.

Figure 2:
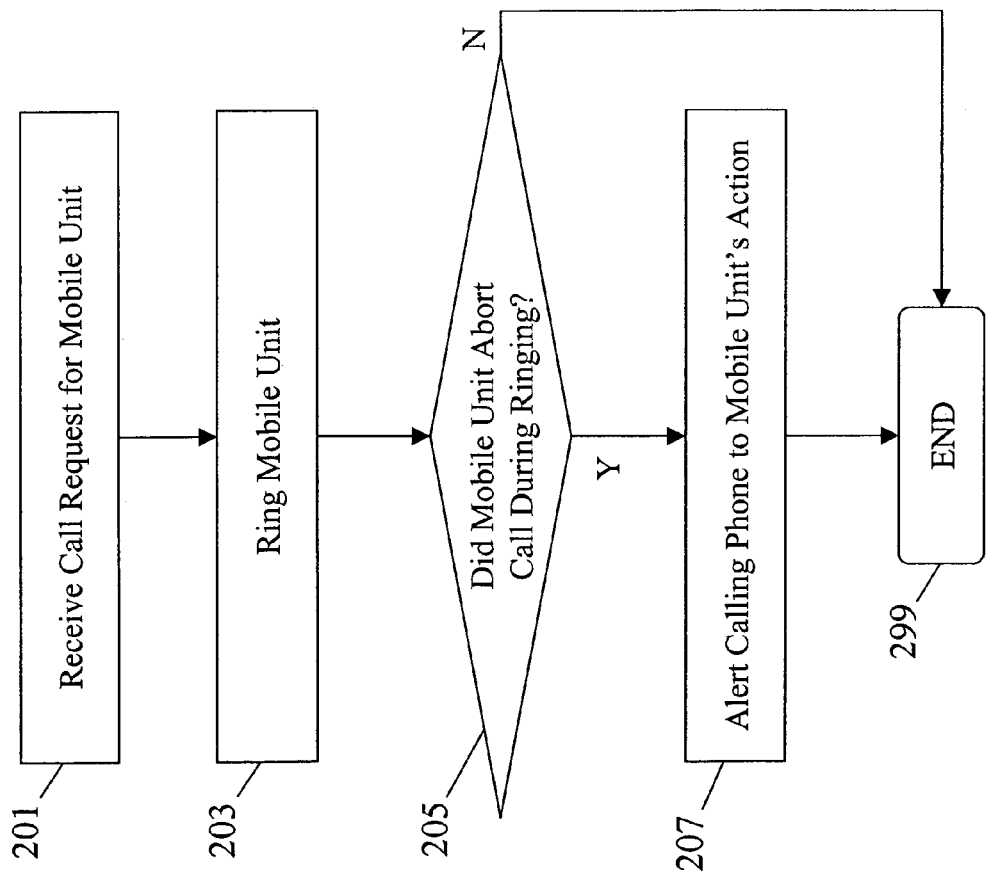
FIG. 2 depicts a flowchart of a method for sending a message to a calling phone when a called phone aborts an incoming call request during ringing in accordance with an exemplary embodiment of the present invention.

FIG. 2 depicts a flowchart 200 of a method for sending a message to a calling phone when a called phone aborts an incoming call request during ringing in accordance with an exemplary embodiment of the present invention.

In accordance with an exemplary embodiment of the present invention, wireless communication network 103 receives (201) a call request for mobile unit 105. The call request may come from a wireline phone, such as wireline phone 102, or from a mobile unit, such as mobile unit 106.

Wireless communication network 103 rings (203) mobile unit 105. The ringing of mobile unit 105 requires the reservation of wireless system resources by MSC 108. In a typical scenario, MSC 108 assigns base station 107 to communicate over-the-air with mobile unit 105. MSC 108 sends a paging request message to base station 107, which pages mobile unit 105. When mobile station 105 responds to the paging message, base station 107 assigns a channel for the call request and alerts mobile unit 105 to the call request.

At this point, in prior art wireless communication networks, the call request may be answered or ignored by mobile unit 105. In accordance with an exemplary embodiment of the present invention, mobile unit 105 can end ringing of mobile unit 105 and send a message to the calling phone. This enhances communication between the called mobile unit and the calling phone while conserving valuable system resources.

Wireless communication network 103 determines (205) if mobile unit 105 has aborted the call request during ringing. In an exemplary embodiment of the present invention, mobile unit 105 aborts the call request by pressing the <END> key on mobile unit 105. A user of mobile unit 105 may also press additional keys prior to the <END> key, and these additional keystrokes can be utilized to send additional information to the calling phone. Base station 107 receives the key sequence from mobile unit 105 and passes it to MSC 108. If mobile unit 105 does not abort the call during ringing, typical call processing occurs and the process ends (299).

If mobile unit 105 does abort the call during ringing as determined at step 205, wireless communication network 103 alerts (207) the calling phone that the mobile unit 105 has aborted the call request during ringing. The MSC preferably alerts the calling phone that the called mobile unit aborted the call request during ringing by playing a message to the calling phone.

In an exemplary embodiment, MSC 108 receives the key sequence that mobile unit 105 pressed to abort the call request during ringing. In an exemplary embodiment of the present invention, the user of the called mobile unit presses the <END> key during ringing. The called mobile unit will send a message to the base station that the <END> key has been pressed. The base station alerts the MSC, which knows that from the key pressed that the called mobile unit has aborted the call request during ringing. The MSC then preferably alerts the calling party that the called mobile unit has denied the call request. The user can, in conjunction with the service provider, define alternate methods of alerting the MSC that the call request is being aborted during ringing, such as key sequences defined by the user.

In a further exemplary embodiment, a user of the called mobile unit presses a numerical sequence representing the number of minutes that the user expects the current call to last, followed by the <END> key. In this embodiment, MSC 108 sends a message to the calling phone that will be played at the calling phone and will alert the calling phone that the called mobile unit aborted the call ringing and will not be available for the number of minutes that the user entered into the mobile unit keypad. In accordance with one embodiment of the present invention, the MSC prevents the called party from completing a call request to the called mobile unit until the time period entered by the user of the called mobile unit has expired. Further, the MSC can block any callers from completing a call request during this time period.

In a further exemplary embodiment, the user of the called mobile unit presses a predetermined key sequence during ringing. The predetermined key sequence alerts the MSC that the called mobile unit does not want to answer this call, but can also convey additional information to the MSC and the calling phone. The predetermined key sequence can be a default set established by the service provider, or can be programmed by the user. The predetermined messages are preferably stored in announcements database 109.

As an example of predetermined key sequences, the user could press "1" <END>, which indicates to the MSC that the user wants a message of "The user is currently busy, and requests that you not call back and remove the user from your call list." Further, a message could tell the calling party that the user is busy and will return the call as soon as possible.

The MSC releases the call and all of the system resources that were reserved in order to place the call request.

While this invention has been described in terms of certain examples thereof, it is not intended that it be limited to the above description, but rather only to the extent set forth in the claims that follow.

We claim:

1. A method for sending a message to a calling phone when a called phone aborts an incoming call request, the method comprising:

receiving a call request at a mobile unit from a calling phone;

determining that the mobile unit has aborted the call request during ringing; and alerting the calling phone that the mobile unit aborted the call request during ringing by communicating the number of minutes that the user expects the current call to last to the calling phone.

2. A method for sending a message to a calling phone when a called phone aborts an incoming call request in accordance with claim 1, wherein the step of determining that the mobile unit has aborted the call request during ringing comprises determining that a predetermined key on the mobile unit has been pressed.

3. A method for sending a message to a calling phone when a called phone aborts an incoming call request in accordance with claim 2, wherein the predetermined key pressed is the <END> key on the mobile unit.

4. A method for sending a message to a calling phone when a called phone aborts an incoming call request in accordance with claim 2, the method further comprising the step of determining additional keys pressed on the mobile unit prior to the predetermined key being pressed.

5. A method for sending a message to a calling phone when a called phone aborts an incoming call request in accordance with claim 4, the method further comprising the step of sending additional information to the calling phone based upon the additional keys pressed.

6. A method for sending a message to a calling phone when a called phone aborts an incoming call request in accordance with claim 1, wherein the step of alerting the calling phone that the mobile unit aborted the call request during ringing comprises playing a message to the calling phone.

7. A method for sending a message to a calling phone when a called phone aborts an incoming call request in accordance with claim 1, the method further comprising the step of blocking incoming call requests intended for the mobile unit during the number of minutes that the user expects the current call to last.

8. A method for sending a message to a calling phone when a called phone aborts an incoming call request in accordance with claim 7, wherein the step of blocking incoming call requests intended for the mobile unit comprises blocking incoming call requests intended for the mobile unit from the calling phone during the number of minutes that the user expects the current call to last.

9. A method for sending a message to a calling phone when a called phone aborts an incoming call request in accordance with claim 1, the method further comprising the step of sending a predetermined message to the calling phone, the predetermined message being associated with a predetermined key sequence pressed on the mobile unit to abort the call request and determine the predetermined message to send.

10. A method for sending a message to a calling phone when a called phone aborts an incoming call request in accordance with claim 9, wherein the predetermined message is assigned by a service provider.

11. A method for sending a message to a calling phone when a called phone aborts an incoming call request in accordance with claim 9, wherein the predetermined message is programmed by the mobile unit.

12. A method for sending a message to a calling phone when a called phone aborts an incoming call request in accordance with claim 1, the method further comprising the step of releasing all system resources that were reserved upon receiving the call request.

* * * * *